(12) United States Patent
Bonino et al.

(10) Patent No.: US 6,232,567 B1
(45) Date of Patent: *May 15, 2001

(54) ARRANGEMENT FOR MOUNTING A PARALLEL-GUIDING DEVICE IN A FORCE MEASURING APPARATUS

(75) Inventors: Bruno Bonino, Mönchaltorf; Hans-Rudolf Burkhard, Wila; Ferdinand Schneider, Winterthur, all of (CH)

(73) Assignee: Mettler-Toledo GmbH, Greifensee (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/111,574

(22) Filed: Jul. 8, 1998

(30) Foreign Application Priority Data

Jul. 10, 1997  (DE) ................................ 197 29 623

(51) Int. Cl.[7] ............................. G01G 3/14; G01G 7/00; G01L 1/04
(52) U.S. Cl. ................... 177/210 EM; 177/212; 177/229; 73/862.621
(58) Field of Search ................ 177/210 EM, 212, 177/229, DIG. 9; 73/862.621

(56) References Cited

U.S. PATENT DOCUMENTS

| 4,429,757 | * | 2/1984 | Kunz ................................ 177/212 |
| 4,545,448 | * | 10/1985 | Kunz ................................ 177/212 |
| 4,722,409 | * | 2/1988 | Kunz ................................ 177/212 |
| 4,798,251 | * | 1/1989 | Maaz et al. ....................... 177/229 |
| 5,141,066 | * | 8/1992 | Strickler ........................... 177/212 |
| 5,340,951 |   | 8/1994 | Hungerbühler et al. .......... 177/229 |
| 5,962,818 | * | 10/1999 | Komoto et al. .................. 177/229 |

FOREIGN PATENT DOCUMENTS

| 2202953 | 10/1988 | (DE) . |
| 4119734 | 12/1992 | (DE) . |
| 4305425 | 8/1994 | (DE) . |
| 4305426 | 8/1994 | (DE) . |

* cited by examiner

*Primary Examiner*—Randy W. Gibson
(74) *Attorney, Agent, or Firm*—Friedrich Kueffner

(57) ABSTRACT

To counteract the adverse effects associated with mounting a parallel-guiding device on a supporting part of a balance, the attachment area (30) is located on a portion (14) of the stationary leg (12) of the parallel-guiding device. Portion 14 projects into the space between the two guide links 3 and 6 by which the load-receiving movable leg (11) of the parallelogram is guided in parallel motion relative to the stationary leg (12).

13 Claims, 6 Drawing Sheets

ARRANGEMENT FOR MOUNTING A PARALLEL-GUIDING DEVICE IN A FORCE MEASURING APPARATUS

BACKGROUND OF THE INVENTION

1. Field of the Invention

The present invention concerns an arrangement for mounting a parallel-guiding device in a force measuring apparatus, particularly in a balance. A load receiver formed by a first leg of the parallelogram in the parallel-guiding device and serving to receive the load to be measured is guided in parallel motion relative to a second leg of the parallelogram by two mutually parallel guide links that are rigid in their lengthwise direction but elastically flexible to bend in the plane of the parallelogram. The second leg of the parallelogram has a fastening area serving to mount it on a supporting part of the force-measuring apparatus, and it also has a portion that projects into the space inside the parallel-guiding device that is delimited by the two guide links. In the direction transverse to the plane of the parallelogram, the parallel-guiding device is delimited by two lateral boundary surfaces that are parallel to the plane of the parallelogram, with the legs of the parallelogram and the guide links extending between them.

2. Description of the Related Art

In mounting arrangements of this kind, the fastening area of the stationary second leg of the parallelogram has to take up the entire moment generated by the force that is to be measured and that acts on the first leg of the parallelogram. This can cause deformations of the parallel-guiding device. In addition, the mounting attachment of the second leg of the parallelogram at its fastening area can introduce stresses into the parallel-guiding device and into parts connected to it. The deformations as well as the mounting stresses can be detrimental to the measuring accuracy.

In a known arrangement of the kind named at the beginning (DE 43 05 425 A1), the stationary as well as the movable leg of the parallelogram have the shape of a hollow profile whose cross-section in the plane of the parallelogram is triangular. The respective sides of the triangle of the stationary and of the movable leg of the parallelogram that extend in the lengthwise direction of the guide links toward the outside of the parallel-guiding device serve as mounting surface to a base plate of the balance and as fastening support for a weighing pan, respectively. Through this sturdy design of the two legs of the parallelogram in the shape of hollow profiles and through the associated mounting geometry, it is possible, admittedly, to alleviate the problems of stress introduction and deformation. However, this design configuration is space-consuming and requires a relatively large amount of material.

Also known (EP 0 573 806 A1) is a design where, in order to reduce unwanted stresses, the block-shaped measuring cell of a force-measuring apparatus is arranged between the two legs of a stiff U-profile that extend parallel to the main planes of the block. By one of its lateral surfaces extending between the main planes of the block, the measuring cell is attached to the bottom portion of the U that connects the two legs. But here, too, the U-profile represents a relatively expensive component. Also, exacting requirements need to be imposed on the lateral surface of the measuring cell that serves for the mounting attachment and on the inside of the U-profile that is in contact with it.

SUMMARY OF THE INVENTION

Therefore, the object of the present invention is to provide a mounting arrangement of the kind named at the beginning that, on the one hand, is simple and inexpensive to manufacture and, on the other hand, deteriorates the measuring accuracy as little as possible.

According to the invention, the problem is solved by arranging the fastening area on that portion of the second leg of the parallelogram that projects into the space inside the parallelogram.

The inventive mounting arrangement conserves space. Also, it does not require expensive work operations on the second leg of the parallelogram that comprises the fastening area. Likewise, no expensive profile component is needed for mounting the parallel-guiding device. Finally, the location chosen for the fastening area in the inventive fastening arrangement is advantageous with regard to the moment generated by the force to be measured, as well as with regard to limiting the undesirable stress introduction.

As a preferred embodiment of the invention, the fastening area is located on a portion projecting between the lateral boundary surfaces into the space inside the parallelogram in a surface part that faces one of the guide links. The guide link next to that surface part has an opening opposite the fastening area through which passes that portion of the supporting part that has an area where it is connectively engaged to the fastening area.

Because the guide links extending between the lateral boundary surfaces parallel to the plane of the parallelogram are opposite the transverse surface areas (relative to the plane of the parallelogram) of the portion that projects into the interior space, the mounting attachment provided in this embodiment traverses one of the guide links. Therefore, the respective guide link is equipped with an opening that allows the passage of the portion of the supporting part that serves for the mounting attachment. Although this opening weakens the guide link to a certain extent, this drawback is offset by the advantages that the mounting arrangement is exceptionally space-saving, that the place on the parallel-guiding device where the mounting portion of the supporting part is joined to the transverse surface area (relative to the plane of the parallelogram) of the portion that projects into the interior space can be kept small, and that it does not require a special operation in the manufacturing process.

In this context, as a further practical refinement of the design, the fastening area and the portion of the supporting part that is joined to it are clamped together with at least one threaded bolt that is engaged in a tapped hole of the portion of the second leg and extends parallel to the plane of the parallelogram. In this configuration, the parallel-guiding device has enough space between its two guide links in the axial direction of the threaded bolt to allow the threaded bolt to be securely anchored in the portion that projects into the interior space.

Deviating from this design, the fastening area and the portion of the supporting part that is joined to it are clamped together with at least one threaded bolt that is engaged in a tapped hole of the supporting part and extends parallel to the plane of the parallelogram. The head of the bolt is arranged in a recess of the portion that projects into the interior space, and the shaft of the bolt passes through a part of the portion that extends from the recess to the transverse surface area. In this configuration, the tapped hole is in the supporting part rather than in the portion of the parallel-guiding device that projects into the interior space. This kind of attachment reduces the mounting stresses in the parallel-guiding device.

In an alternative embodiment, the fastening area is located on one of the lateral boundary surfaces of the portion of the second leg of the parallelogram that projects into the interior of the parallel-guiding device, and the supporting part is provided with a portion that extends along the lateral boundary surface at the location of the fastening area and has an area where it is joined to the fastening area.

Because the lateral boundary surfaces of the portion of the second leg of the parallelogram that projects into the interior of the parallel-guiding device are open on both sides of the parallel-guiding device, the place for the fastening area is freely selectable in accordance with applicable requirements within the entire available surface area of the lateral boundary surfaces of the portion that projects into the interior. In contrast to the attachment on a transverse surface area—opposite one of the guide links—of the portion that projects into the interior, which requires a certain minimum dimension of that portion transverse to the plane of the parallelogram, this alternative embodiment has the great advantage that the dimension of the parallel-guiding device transverse to the plane of the parallelogram can be as small as desired, which can bring considerable material and cost savings.

Similar advantages are achieved with an embodiment wherein the fastening area is arranged on the portion of the second leg of the parallelogram that projects into the interior of the parallelogram-guiding device in places that are across from each other in the direction perpendicular to the plane of the parallelogram. Further in this embodiment, the supporting part is provided with two portions, each of which extends along and has an area where it is joined to one of the places that are across from each other. While in the embodiment of the preceding paragraph the attachment to the supporting part takes place on only one of the two lateral boundary surfaces, the embodiment of the present paragraph provides for the supporting part to be joined to both lateral boundary surfaces of the portion projecting into the interior of the parallel-guiding device. Added to the advantages of the previously described attachment on only one of the lateral boundary surfaces, this bilateral mode of attachment enhances the rigidity.

With both the one-sided as well as the double-sided attachment of the foregoing description, it is practical if the fastening area and the matching area or areas of the supporting part are bolted together by a screw bolt that extends transverse to the plane of the parallelogram. With either mode of attachment, a secure connection between the parallel-guiding device and the supporting part is accomplished.

Within the scope of the invention, it is further of practical advantage that the supporting part has the form of a mounting plate that extends transverse to the plane of the parallelogram and can be anchored on a chassis base of the force-measuring apparatus. The portion of the supporting part that has an area where it joins the fastening area extends perpendicular to the mounting plate.

In the embodiment of the inventive arrangement that is based on the concept of a mounting plate, the parallel-guiding device is not directly connected to the chassis base of the force-measuring apparatus, but rather by means of the mounting plate which, in turn, is anchored to the chassis base. This has the effect of delaying the propagation of temperature changes, and it facilitates work operations in manufacturing as well as in servicing the force-measuring apparatus. The mounting plate also has the advantage that it can be adapted to different existing chassis bases or enclosures if it is equipped with different corresponding mounting holes.

The inventive arrangement is particularly advantageous in embodiments where the parallel-guiding device comprises a force-transmitting lever whose fulcrum is supported by the portion of the second leg of the parallelogram that projects into the interior of the parallel-guiding device.

The force-transmitting lever serves to transmit the force that is to be measured from the first leg of the parallelogram, which functions as force receiver, to a measuring system of the force-measuring apparatus, such as a magnetic force compensation system. Because on the one hand the force-transmitting lever bearing the force to be measured is supported by the portion that projects into the interior and on the other hand the fastening area of the parallel-guiding device, too, is located on this portion, the force taken up by the fulcrum support of the force-transmitting lever is transferred to the fastening area in a very direct manner.

As a practical design of all embodiments, the parallel-guiding device can be formed out of a single, essentially brick-shaped material block. In this, the individual portions of the parallel-guiding device, such as the two legs of the parallelogram, the guide links and the portion projecting into the interior, may be separated from each other by only narrow linear cuts of the kind that can, e.g., be made by spark erosion. The inventive arrangement of the fastening area on that portion of the second leg of the parallelogram that projects into the interior of the parallel-guiding device has the purpose of utilizing the advantages that are gained from this kind of a space- and labor-saving design of the parallel-guiding device.

Other characteristic features, details, and advantages of the invention will be presented in the following description and in the drawing that also has the express purpose of disclosing all details essential to the invention that are not mentioned in the text.

DETAILED DESCRIPTION OF THE INVENTION

Figure 1:
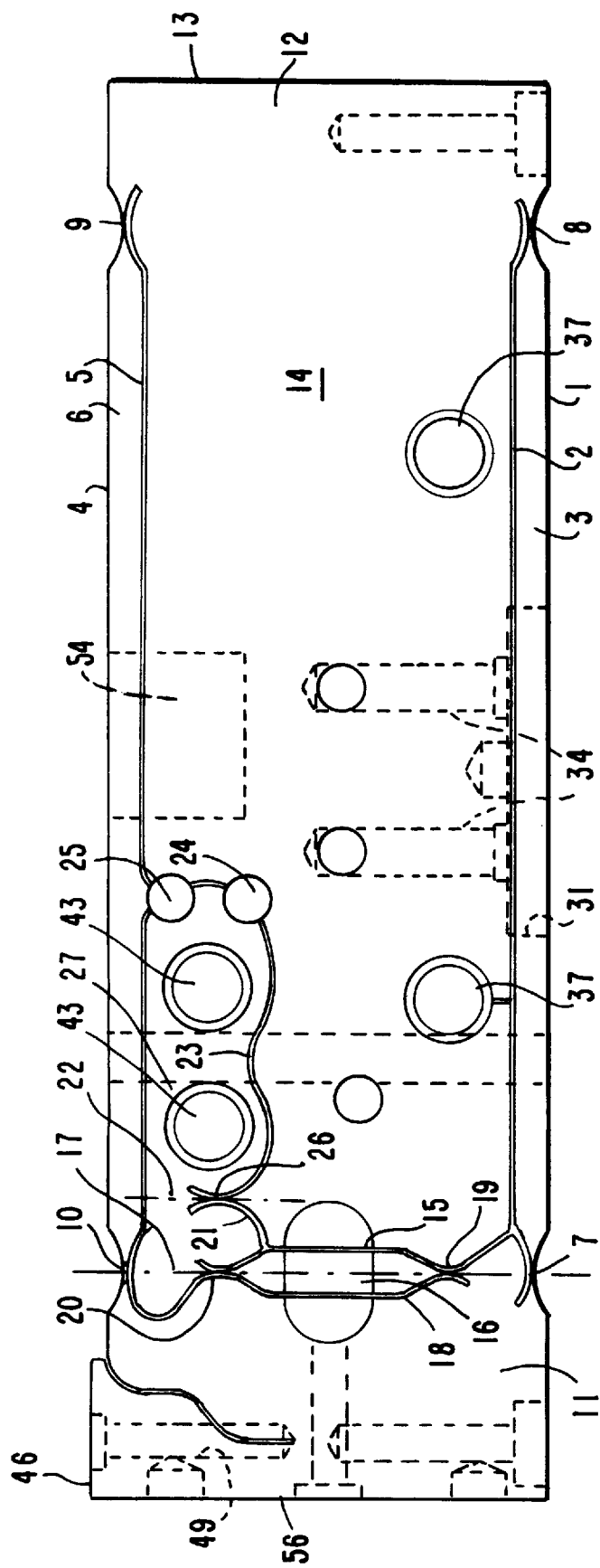
FIG. 1 represents a side view of an embodiment of a parallel-guiding device seen in a direction perpendicular to the plane of the parallelogram.

As shown in FIG. 1, in a brick-shaped material block whose main surface lies in the plane of the drawing and is facing the viewer and whose thickness, perpendicular to the plane of the drawing, is markedly less than its dimensions along the plane of the drawing, thin linear cuts are formed, e.g., by spark erosion, that are cutting through the material block in the direction of its thickness. One of these thin linear cuts, shown in FIG. 1 as linear cut 2 which runs parallel to and near the bottom edge 1 of the material block, delimits a lower guide link 3 on the side of the link that faces the interior of the material block, while a linear cut 5 that runs parallel to and near the top edge 4 of the material block delimits an upper guide link 6 on the side of the link that faces the interior of the material block. The sides of the guide links 3 and 6 that face away from the interior are formed by portions of the side surfaces of the material block that are perpendicular to the plane of the drawing.

The two linear cuts 2, 5 have curved end portions that are convex toward the outside of the material block. Opposite the curved end portions of the cuts and shaped like their mirror images are depressions in the bottom edge 1 and top edge 4 of the material block. As a result, the ends of the guide links 3, 6 are shaped as thinned-down portions 7, 8, 9, 10 from which the guide links, while maintaining their rigidity lengthwise, receive elastic flexibility to bend in a direction transverse to their longitudinal axis and parallel to the plane of the drawing.

In this mode of displacement, the thinned-down portions 7, 8, 9, 10, defining the pivot lines of the guide links 3, 6, lie at the corners of a parallelogram in the drawing plane of FIG. 1. A first leg 11 of this parallel-guiding device is formed by the portion of the material block shown to the left of the two thinned-down portions 7, 10 on the left in FIG. 1. Opposite the first leg 11 that connects the two guide links 3, 6 at their left thinned-down portions 7, 10 in FIG. 1, the second parallelogram leg 12 that connects the guide links 3, 6 beyond the two thinned-down portions 8, 9 on the right in FIG. 1 is formed by the portion 12 of the material block. The second parallelogram leg 12, delimited on its outward-facing side 13 by lateral surface portions of the material block that are perpendicular to the drawing plane of FIG. 1, has a portion 14 projecting into the interior space of the parallel-guiding device that is enclosed by the two legs 11, 12 of the parallelogram and the two guide links 3, 6.

The portion 14 is separated from the lower guide link 3 by the linear cut 2. Where the latter changes from a straight line to the curve that defines the lower left thinned-down portion 7, another linear cut 15 branches off extending in the direction from the lower guide link 3 toward the upper guide link 6 and separating the portion 14, in FIG. 1 to the right of the linear cut 15, from a coupling member 16 located to the left of the linear cut. In the area of the two end portions of the coupling member 16, which are located on an imaginary connecting line 17 between and at a distance from the two thinned-down portions 7, 10, the linear cut 15 has sections that are convex-curved to the left. In combination with a linear cut 18 forming the mirror image of cut 15 relative to the imaginary connecting line 17, the curved sections define thinned-down portions 19, 20 of the coupling member 16 centered on the connecting line 17. From the thinned-down portion 20 of the coupling member 16 next to the thinned-down portion 10 of the upper guide link 6, the linear cut 18 runs into the cut 5 that defines the upper guide link 6. The linear cut 15 demarcates the portion 14 along the section that starts from linear cut 2 to the place where it enters into the curve that defines the thinned-down portion 20 of the coupling member 16 near the thinned-down portion 10 of the upper guide link. At this point, a linear cut 21 branches off forming the continuing border of the portion 14 and ending in a curve whose convex side faces an imaginary line 22 that runs transverse to the upper guide link 4. Another linear cut 23 starts with a convex curve that mirrors the cut 21 relative to the imaginary line 22, then extends essentially in the longitudinal direction of the upper guide link 6 to a bore hole 24, continues from there for a short distance to another bore hole 25 that connects to the linear cut 5 that delimits the upper guide link 6. Through this design, the portion 14 projecting from the second parallelogram leg 12 is delimited entirely by the lower linear cut 2, the linear cut 15 that branches off from cut 2, the linear cut 21 branching off from cut 15, the further cut 23 and, connected to the latter, a part of the linear cut 5 that delimits the upper guide link 4.

At the same time, the curves of the linear cuts 21 and 23 that mirror each other across the imaginary line 22 define between themselves a standing flexure fulcrum 26 for a force-transmitting lever 27 that is separated from the portion 14 by the linear cuts 21 and 23 and from the upper guide link 6 by the part of cut 5 that lies opposite the further cut 23. The arm of the force-transmitting lever which in FIG. 1 lies to the left of the standing flexure fulcrum 26 and whose left end is separated from the first parallelogram leg 11 by the part of cut 18 running toward the thinned-down portion 10 is connected to the thinned-down portion 20 of the coupling member 16 whose opposite thinned-down portion 19 is, in turn, connected to the first parallelogram leg 11.

Figure 2:
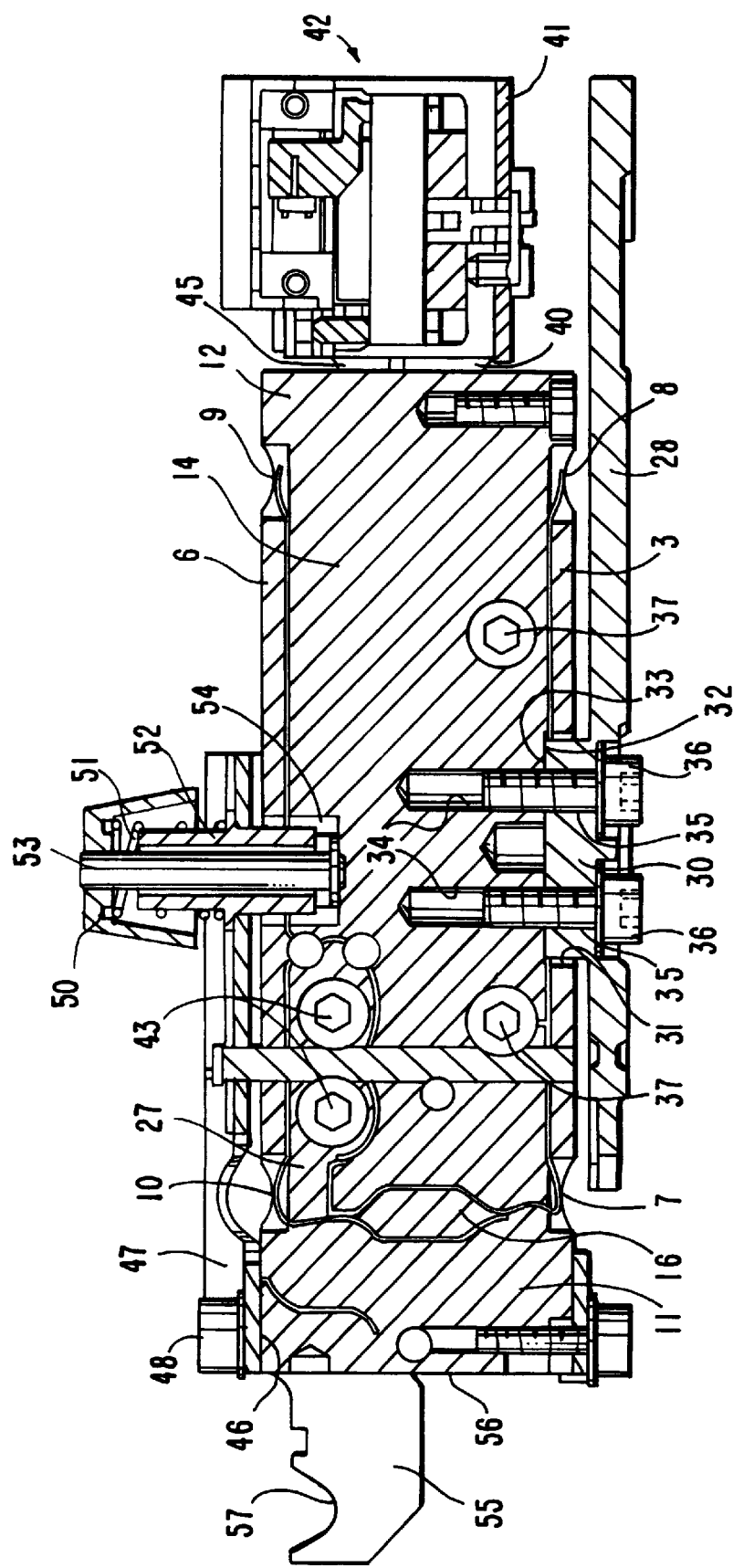
FIG. 2 represents the parallel-guiding device of FIG. 1 mounted in a force-measuring apparatus, shown in a cross-sectional view parallel to the plane of the parallelogram.
Figure 3:
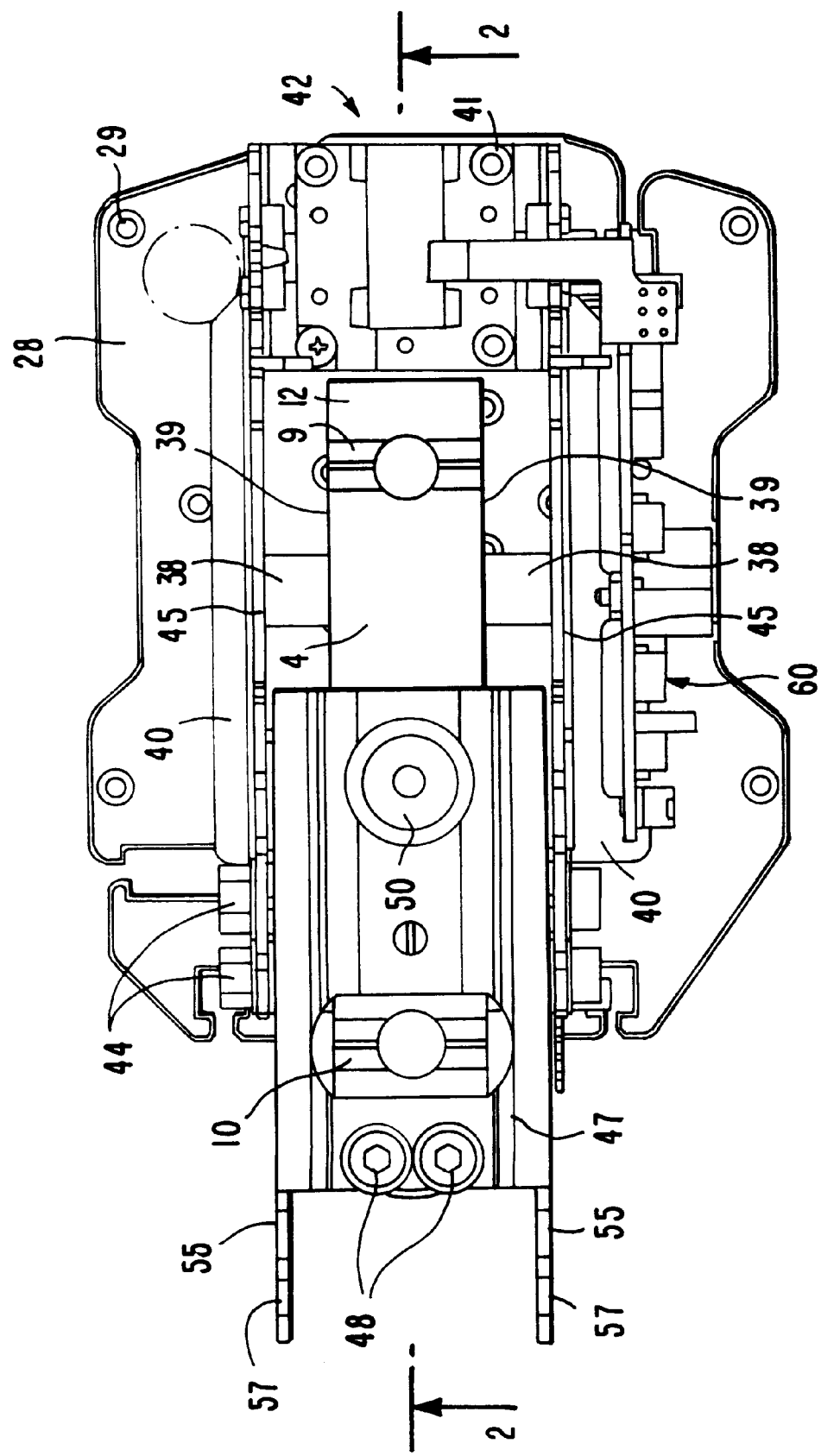
FIG. 3 represents a view from above of the mounted parallel-guiding device, perpendicular to the viewing direction of FIG. 2, wherein the line A—A indicates the plane of the section of FIG. 2.
Figure 4:
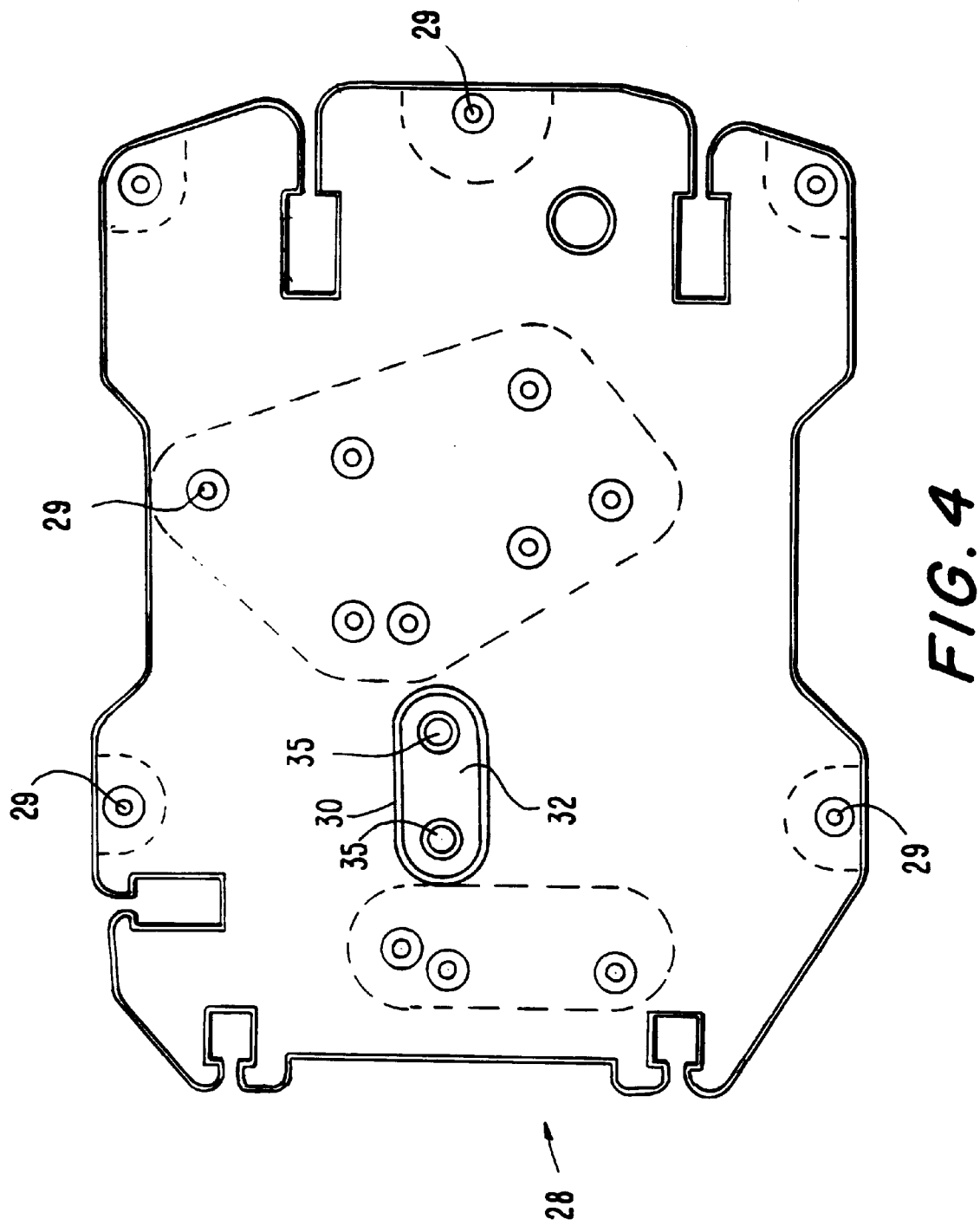
FIG. 4 represents a view from above of the mounting plate used in the embodiment of FIGS. 1 to 3.

The parallel-guiding device shown in FIG. 1 is mounted in a manner illustrated in FIGS. 2 through 4 in a force-measuring apparatus, e.g., in a balance. An essentially flat mounting plate 28, shown by itself in FIG. 4 and in the assembled state in FIGS. 2 and 3, serves as supporting part. It has different configurations of attachment holes 29 for anchoring it with screws on chassis frames of force measuring apparatuses of different designs, e.g., on the enclosure bottom parts of balances. A raised portion 30 projects from the plane of the mounting plate 28, which in the assembled state is transverse to the plane of the parallelogram. The dimensions of the raised portion transverse to the plane of the parallelogram are smaller than the respective dimensions of the lower guide link 3. In accordance with FIG. 2, in the assembled state the raised portion 30 passes with clearance through an opening 31 in the lower guide 3. At its free end 32, which extends transverse to the plane of the parallelogram, the raised portion 30 engages a surface portion 33 of the portion 14 of the second parallelogram leg 12 that projects into the interior of the parallel-guiding device, the surface portion 33 being transverse to the plane of the parallelogram, facing the lower guide link 3 and serving as fastening area.

At the location of the opening 31, the portion 14 of the second parallelogram leg 12 that projects into the interior of the parallel-guiding device has two tapped holes 34 whose axial direction is transverse to the lengthwise direction of the lower guide link 3 as well as parallel to the plane of the parallelogram. Matching the two tapped holes 34, the mounting plate 28 has two through holes 35 in the portion 30 that serves for the mounting connection. Passing through the through holes 35 are two screw bolts 36 whose threaded shafts engage the tapped holes 34 and whose heads bear against the side of the mounting plate 28 that faces away from the parallel-guiding device. Thereby, the mounting plate 28 and the parallel-guiding device are firmly clamped together.

FIGS. 2 and 3 show additional components of the balance that are fastened to the parallel-guiding device for which the latter is equipped with mounting holes shown in FIG. 1. At the detail level, the portion 14 of the second parallelogram leg 12 that projects into the interior of the parallel-guiding device has in its lower part, adjacent to the lower guide link, two clear mounting holes 37, whose axial direction is transverse to the plane of the parallelogram. By means of screw bolts passing through the mounting holes 37 and spacers 38, two lateral holders 40 are connected to the parallel-guiding device with clearance space to the two lateral boundary surfaces 39 that are parallel to the plane of the parallelogram. The lateral holders 40 extend along both sides of the parallel-guiding device parallel to the lengthwise direction of the guide links 3, 6 toward the second parallelogram leg 12 and beyond. In the space beyond the second parallelogram leg 12, the lateral holders 40 form a support platform 41 for a permanent magnet of a magnetic force compensation system 42. Within this concept, the two lateral holders 40 may be parts of an integral single-piece unit.

Further, the force-transmitting lever 27 has two mounting holes 43 transverse to the plane of the parallelogram that are to receive screw bolts 44 by which lever extensions 45 are attached to the force-transmitting lever 27 on both sides of the parallel-guiding device with spacers 38 providing clearance. The lever extensions 45 extend at a distance from the lateral boundary surfaces 39 toward the magnetic compensation system 42 where they form a holding frame for a compensation coil that is immersed in the magnetic field of the permanent magnet of the force compensation system.

The first parallelogram leg 11 has an upper rim surface 46 parallel to the top edge 4 of the upper guide link 6, on which a weighing pan carrier 47 extending toward the second parallelogram leg 12 about as far as the center of the upper guide link 6 is attached by means of two screw bolts 48 that extend parallel to the plane of the parallelogram and transverse to the lengthwise direction of the guide links 3, 6 and engage in tapped holes 49 of the first parallelogram leg 11. At the opposite end of the weighing pan carrier 47, relative to the first parallelogram leg 11, a weighing pan support cone 50 is resiliently supported by means of a helix spring 51. The helix spring 51 is guided along the outer circumference of a tube-shaped part that rises from the topside (which faces away from the upper guide link 6) of the weighing pan carrier 47. A guide bolt 53, attached to the weighing pan support cone 50, is movably guided inside the tube-shaped part.

The tube-shaped part 52 and the guide bolt 53 held inside it project beyond the bottom surface of the weighing pan carrier 47 that faces the upper guide link 6 and extend with clearance into an opening 54 that is formed in the upper guide link 6 and in the adjacent area of the portion 14. The opening 54 lies opposite the opening 31 of the lower guide link.

The weighing pan carrier 47 that extends above the upper guide link 6 essentially transverse to the plane of the parallelogram has angled-down side portions 55 at a distance from, as well as parallel to, the lateral boundary surfaces 39 of the parallel-guiding device. The side portions 55 extend in the direction toward the lower guide link 3 about as far as the center of the parallel-guiding device. A part of the side portions 55 that projects beyond the front surface 56 of the first parallelogram leg 11 extending between the two guide links 3, 6 is equipped with a holder 57 onto which a reference weight may be placed for the purpose of calibrating the apparatus.

Figure 7:
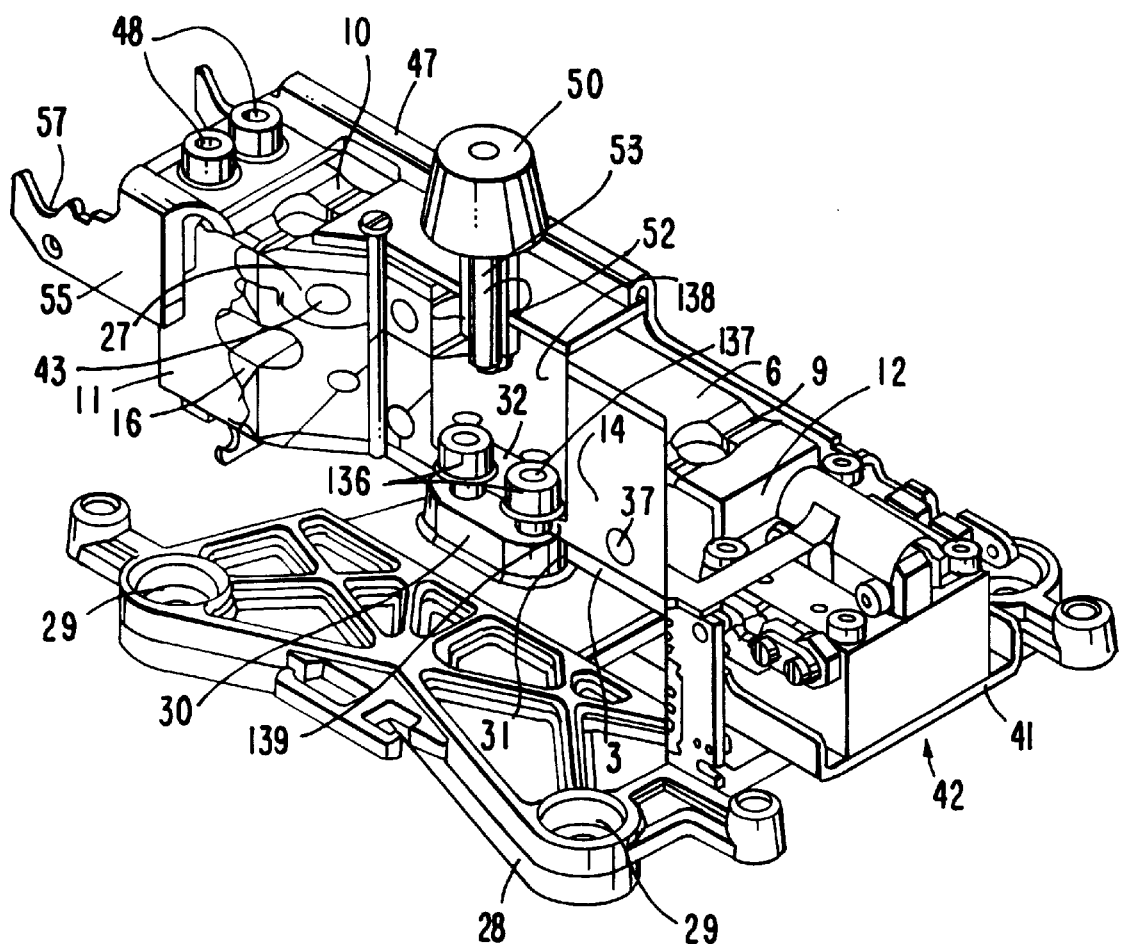
FIG. 7 represents a partially cut-away perspective view of an embodiment that is analogous to the embodiment of FIGS. 1 to 4 but incorporates a variation in the mounting connection.

In a partially cut-away perspective view FIG. 7 shows an embodiment that largely coincides with the embodiment of FIGS. 1 through 4. The corresponding parts are identified by the same reference numbers, and the description of FIGS. 1 through 4 also applies to them. As a first dissimilarity, the mounting plate 28 in FIG. 7 is shaped somewhat differently, distinguished particularly by a perforated, latticed design.

Apart from this, however, the essential difference is that the fastening portion 30 of the mounting plate 28 has tapped holes instead of the through holes 35 of the embodiment of FIGS. 1 through 4. Instead of the screw bolts 36 of the embodiment of FIGS. 1 through 4, the embodiment of FIG. 7 has two screw bolts 136 extending from the portion 14 that projects into the interior of the parallel-guiding device into the tapped holes of the mounting plate 28 and are firmly engaged in these tapped holes. As seen in FIG. 7, in the part that is cut away to the central plane of the parallel-guiding device, the portion 14 has an opening 138, also extending through the upper guide link 6, which runs parallel to the lateral boundary surfaces that delimit the parallel-guiding device and extends in the direction toward the surface portion 33 of the portion 14 that faces the lower guide link 3. The end of the opening 138 closest to the surface portion 33 is parallel to the surface portion 33 and serves as shoulder area for the bolt heads 137 of the screw bolts 136, whereby the parallel-guiding device by means of screw bolts 136 is clamped firmly against the free end 32 of portion 30 of the mounting plate 28.

Figure 5:
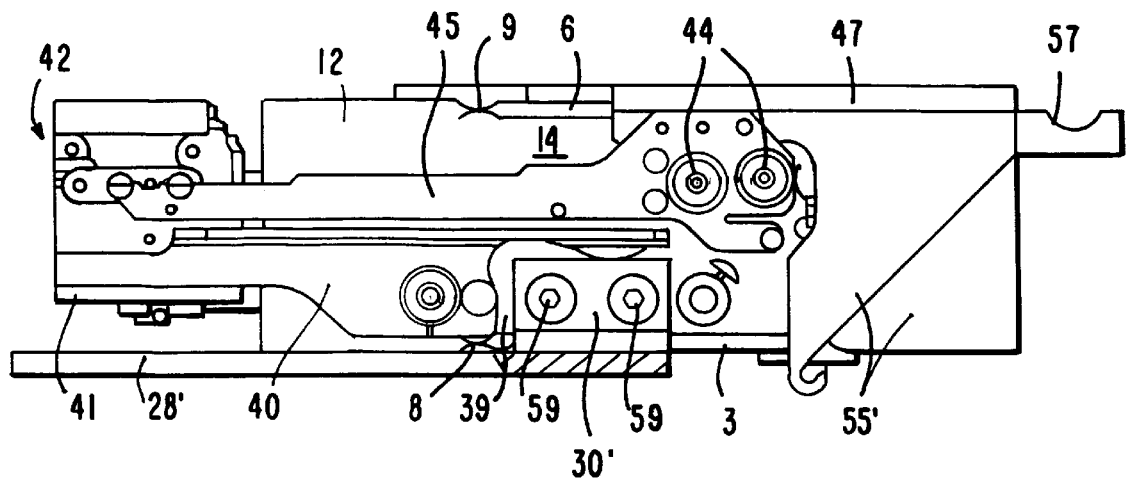
FIG. 5 represents a side view, perpendicular to the plane of the parallelogram, of another embodiment of a parallel-guiding device mounted in a force-measuring apparatus.
Figure 6:
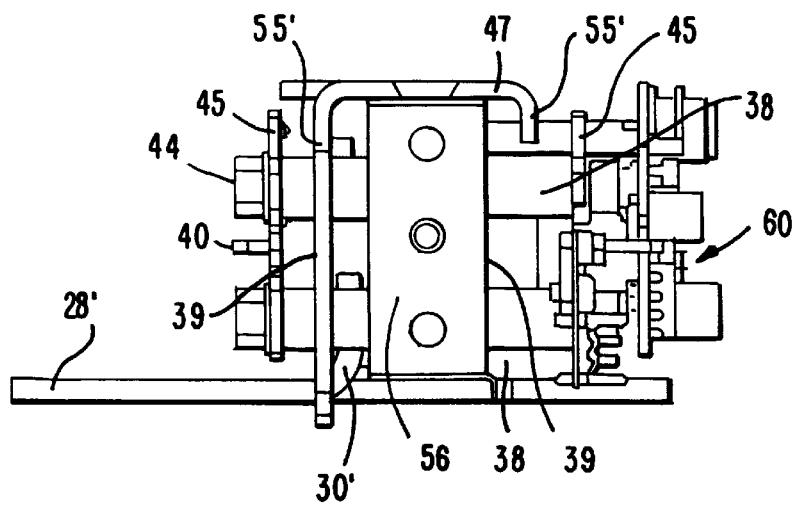
FIG. 6 represents the mounted parallel-guiding device of FIG. 5 as seen from the right, viewing in a direction parallel to the plane of the drawing of FIG. 5.

An embodiment illustrated in FIGS. 5 and 6 essentially corresponds to the embodiment of FIGS. 1 through 4 except for the mounting attachment of the parallel-guiding device. Therefore, the corresponding parts were given the same reference numbers, and the description of FIGS. 1 through 4 also applies to them. Only the somewhat different design of the side portions 55 of the weighing pan carrier 47 needs to be pointed out. To indicate the difference in shape, the reference number 55' for these side portions in FIGS. 5 and 6 is differentiated by the prime symbol.

Deviating from the embodiment shown in FIGS. 1 through 4, the fastening area of the parallel-guiding device in the embodiment of FIGS. 5 and 6 is located on the lateral boundary surface 39—facing the viewer in FIG. 5 and located to the left in FIG. 6—of the portion 14 of the second parallelogram leg 12 projecting into the interior of the parallel-guiding device. For this purpose, the mounting plate 28' that is otherwise essentially identical with the mounting plate 28 of FIG. 4, instead of the pedestal-shaped portion 30 shown in FIG. 4, has a plate-shaped portion 30' that stands out perpendicularly from the main plane of the mounting plate 28' and parallel to the plane of the parallelogram. The portion 30', through one of its two surfaces that are parallel to the plane of the parallelogram, is joined to the lateral boundary surface 39 of the parallel-guiding device. Two screw bolts 59 extending transverse to the plane of the parallelogram clamp the portion 30' of the mounting plate 28' to the portion 14 of the second parallelogram leg 12 that projects into the interior of the parallel-guiding device.

The principle on which the mounting attachment in FIGS. 5 and 6 is based could also be realized in such a manner that also the lateral boundary surface 39 facing away from the plate-shaped portion 30' is in contact with a portion corresponding to the portion 30' and standing out from the main plane of the mounting plate 28' where the two portions are clamped together with the parallel-guiding device by means of the screw bolts 59 (FIG. 5). Particularly in FIG. 1 there are additional through holes and tapped holes without reference numbers. These are irrelevant for the mounting of the parallel-guiding device or for the attachment of the other parts of the balance and are therefore not covered in detail in this description. In part, they serve to hold the material block in the process of producing the linear cuts through electrical discharge erosion or for inserting the erosion wire or also for other purposes. In addition, the FIGS. 3 and 6 show in a generalized manner a circuit board 60 complete with electronic components. This circuit board 60 performs the electronic processing of the measuring signal generated by the magnetic force compensation. The measuring signal occurs when a load is placed on a weighing pan (not shown) held by the weighing pan support cone 50 whereby the first parallelogram leg 11, being connected to the weighing pan carrier 47, is being displaced by a small amount relative to the second parallelogram leg 12. This displacement is transferred from the first parallelogram leg 11 through the flexibly connected coupling member 16 to the likewise flexibly connected force-transmitting lever 27. As a result, the compensation coil attached to the lever extensions 45 is displaced inside the electromagnetic force compensation system by a corresponding amount in proportion to the lever ratio. The electromagnetic force compensation system controls and adjusts the compensating current in the force compensation coil in such a manner that the displacement is cancelled. The measuring signal is derived from the compensation current required to restore the state of equilibrium.

LIST OF REFERENCE NUMBERS 1 bottom edge
2 linear cut
3 lower guide link
4 top edge
5 linear cut
6 upper guide link
7 thinned-down portion
8 thinned-down portion
9 thinned-down portion
10 thinned-down portion
11 first leg of the parallelogram
12 second leg of the parallelogram
13 outward-facing side of 12
14 portion of 12
15 linear cut
16 coupling member
17 imaginary connecting line
18 linear cut
19 thinned-down portion
20 thinned-down portion
21 linear cut
22 imaginary line
23 additional linear cut
24 bore hole
25 bore hole
26 standing flexure fulcrum
27 force-transmitting lever
28, 28' mounting plate
29 attachment holes
30, 30' portion of 28, 28'
31 opening
32 free end of 30
33 surface portion of 14
34 tapped holes
35 through holes
36 screw bolt
37 mounting holes
38 spacer
39 lateral boundary surfaces
40 lateral holders
41 support platform
42 magnetic force-compensation system
43 mounting holes
44 screw bolt
45 lever extensions
46 upper rim surface of 11
47 weighing pan carrier
48 screw bolt
49 tapped hole
50 pan support cone
51 helix spring
52 tube-shaped part
53 guide bolt
54 opening
55, 55' side portions of 47
56 front surface of 11
57 holder for reference weight
59 screw bolt
60 circuit board
136 screw bolt
137 bolt head
138 opening
139 part of 14

What is claimed is:

1. An arrangement for mounting in a force measuring apparatus a parallel-guiding device in the shape of a parallelogram, the parallel-guiding device comprising a load receiver formed by a first leg of the parallelogram and serving to receive a load to be measured, the parallel-guiding device further comprising a second leg of the parallelogram and two parallel guide links connecting the first and second legs to one another to complete the parallelogram, the first and second legs being guided in parallel motion relative to one another by the two parallel guide links, wherein the two parallel guide links are rigid in a lengthwise direction thereof but elastically flexible to bend in a plane defined by the parallelogram, wherein the first leg, the second leg, and the two parallel guide links each have opposite lateral side surfaces, wherein the parallel-guiding device is delimited in the direction transverse to the plane of the parallelogram by two lateral boundary surfaces which extend parallel to the plane of the parallelogram and in which the opposite lateral side surfaces of the first and second legs and the two parallel guide links are respectively positioned so that the first and second legs and the guide links extend between the two lateral boundary surfaces, wherein the second leg has a portion projecting into a space inside the parallelogram between the two parallel guide links, wherein the second leg has a single fastening area for firmly attaching the second leg and thus the parallel-guiding device to a supporting part of the force-measuring apparatus, and wherein the fastening area is provided on the portion of the second leg projecting into the space inside the parallelogram.

2. The arrangement according to claim 1, wherein
 the fastening area is located on a surface area of the portion projecting into the space inside the parallelogram, extends between the two lateral boundary surfaces, and faces one of the guide links, and
 the guide link facing the surface area has an opening to the fastening area through which passes a portion of the supporting part which has an area that engages the fastening area.

3. The arrangement according to claim 2, wherein the fastening area and the area of the supporting part engaged in it are clamped together by at least one screw bolt that is parallel to the plane of the parallelogram and is engaged in a tapped hole of the portion of the second parallelogram leg.

4. The arrangement according to claim 2, wherein
 the fastening area and the area of the supporting part engaged in the fastening area are clamped together by at least one screw bolt that has a head and a shaft, is parallel to the plane of the parallelogram, and is engaged in a tapped hole of the supporting part, the head is located in a recess of the portion projecting into the space inside the parallelogram, and the shaft extends through a part between the recess and the surface area of the portion projecting into the space inside the parallelogram.

5. The arrangement according to claim 1, wherein the fastening area is located on one of the lateral boundary surfaces of the portion of the second parallelogram leg projecting into the space inside the parallelogram and the supporting part is provided with a portion that extends along the lateral boundary surface at the location of the fastening area and has an area connectively engaged with the fastening area.

6. The arrangement according to claim 5, wherein the fastening area and the area of the supporting part connected to it are fastened together by at least one screw bolt extending transverse to the plane of the parallelogram.

7. The arrangement according to claim 1, wherein the fastening area is located, relative to the direction perpendicular to the plane of the parallelogram, in transversely opposite areas of the lateral boundary surfaces of the portion of the second parallelogram leg (12) projecting into the space inside the parallelogram, and the supporting part has two portions each of which, respectively, extends along and has an area connectively engaged with one of the transversely opposite areas of the fastening area.

8. The arrangement according to claim 7, wherein the fastening area and the areas of the supporting part connectively engaged with it are fastened together by at least one screw bolt extending transverse to the plane of the parallelogram.

9. The arrangement according to claim 2, wherein the supporting part is designed as a mounting plate, firmly attachable to a chassis base of the force-measuring apparatus, extending transverse to the plane of the parallelogram, and wherein an engaging portion of the supporting part that engages the fastening area projects from the mounting plate.

10. The arrangement according to claim 1, wherein the parallel-guiding device has a force-transmitting lever whose fulcrum is supported by the portion of the second parallelogram leg projecting into the space inside the parallelogram.

11. The arrangement according to claim 1, wherein the parallel-guiding device is formed of one single, integral, essentially brick-shaped material block.

12. The arrangement according to claim 9, wherein the engaging portion projects perpendicularly from the mounting plate.

13. The arrangement according to claim 10, wherein the fulcrum of the force-transmitting lever is located adjacent the single fastening area of the second leg.

* * * * *